Nov. 6, 1956  C. R. VAN HORN ET AL  2,769,364

LENS CAP

Filed March 1, 1954

United States Patent Office 2,769,364
Patented Nov. 6, 1956

2,769,364

LENS CAP

Clarence Richard Van Horn and Gustave Paul Pirwitz, Irondequoit, N. Y., assignors to Wollensak Optical Company, Rochester, N. Y., a corporation of New York Application March 1, 1954, Serial No. 413,142

2 Claims. (Cl. 88—1)

The invention relates to a lens cap for use on an optical tube member for preventing the entrance of foreign matter when said tube member is not in use.

An object of the invention is to provide a generally improved and more satisfactory lens cap.

Another object is to provide a lens cap which is adapted to prevent the entrance of foreign matter.

Still another object is to provide a lens cap of simple construction requiring no special tools or skills in use.

A further object is the provision of a lens cap cooperating with the tube on which it is detachably mounted in such a way that it may be quickly and easily placed on the tube, that it will become and remain in tightly sealed relation to the end of the tube without any special care or attention on the part of the operator, and that it may be instantly removed from the tube when desired.

These and other desirable objects may be attained in the manner disclosed as an illustrative embodiment of the invention in the following description and in the accompanying drawings forming a part hereof, in which.

The same reference numerals throughout the several views indicate the same parts.

The lens cap of the present invention is adapted for use on the end of a sun shade or any other suitable lens tube for preventing the entrance of foreign matter such as moisture or dust which may injure the lens or its coating, besides interfering with the normal vision through the tube, or entrance of rigid objects which may mar or break the lens.

Figure 1:
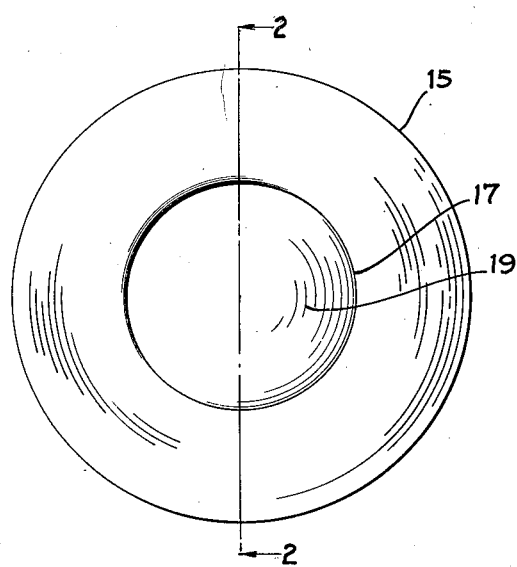
Fig. 1 is a front elevation of the lens cap.
Figure 2:
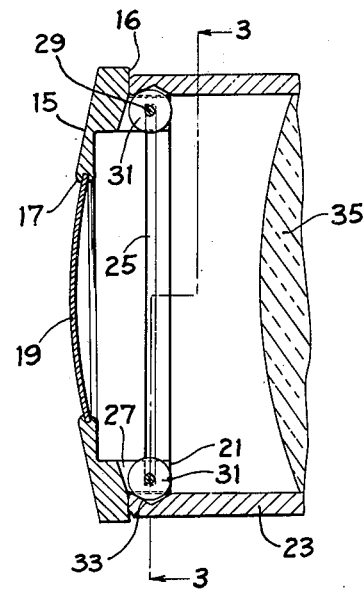
Fig. 2 is a central vertical section through the lens cap and a portion of an optical tube member taken substantially on the line 2—2 of Fig. 1.

In the preferred form of the invention, the lens cap includes an approximately circular body member 15 having a frusto-conical front face, and a rear face having a flat portion 16 at its outer margins. The central portion of the body member is of reduced thickness and has an opening 17 extending therethrough in which is staked a thinner disk 19, which may carry for example a decoration or the name or trademark of the manufacturer. Extending rearwardly from the rear face of the body member 15, and in coaxial relationship therewith, is an approximately cylindrical flange 21 having a diameter less than that of the body member. As shown in Fig. 2, the outside diameter of the flange 21 is also slightly less than the internal diameter of the optical tube member 23 to permit insertion of the flange 21 within the tube member.

Along the internal periphery of the flange 21 is a circumferential groove 25 which is located in a plane spaced from and parallel to the free edge of the flange 21. Milled through the flange 21 are a pair of diametrically opposed radial slots 27 which extend from the free edge of the flange 21 to and partly into the body member.

Figure 4:
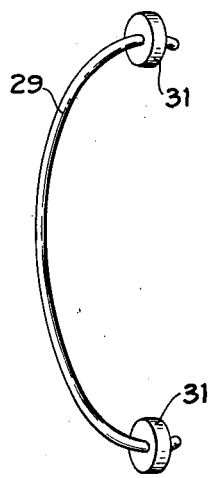
Fig. 4 is a perspective showing the lens cap securing means removed from the cap.
Figure 3:
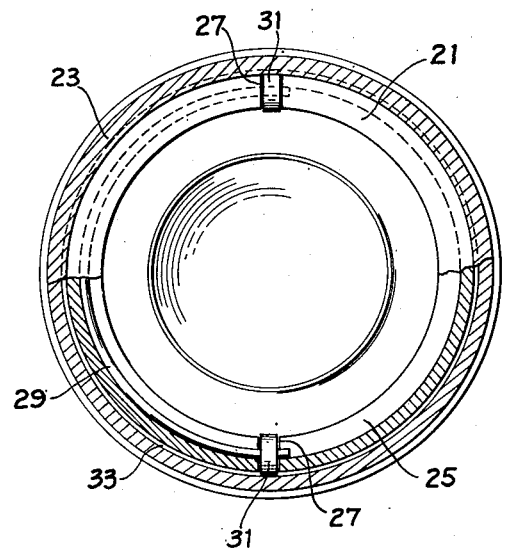
Fig. 3 is a vertical section taken substantially on the line 3—3 of Fig. 2.

Disposed within the circumferential groove 25 is a resilient axle 29 formed of spring wire or other suitable material, having at each of its end portions a rotatable roller 31 which seats into one of the slots 27. As shown in Fig. 2, the depth of the circumferential groove 25 is such that a portion of each roller 31 extends outwardly beyond the outside circumference of the flange 21 when the axle and rollers are positioned. As seen from Fig. 4, the axle 29, when removed from the lens cap, assumes an arcuate position wherein the distance between the outside portions of the axle, on a straight line down through the rollers, is greater than the diameter of the bottom of the groove 25. Therefore, to position the axle and rollers the ends of the axle are sprung resiliently nearer to each other, the axle is placed in the groove 25, and the ends are released. The spring tension or resilient force of the axle tends to urge the ends of the axle away from each other thereby causing the axle ends to abut firmly the outside wall of the groove 25 and retain the axle in position.

In order to receive and retain the lens cap, the internal surface of the optical tube member 23 is provided with a circumferential V-shaped groove 33 which is spaced from and parallel to the edge of the tube member 23. To provide for a snug fit between the lens cap and tube member, the V-shaped groove is so positioned that the horizontal distance between the flat marginal portion of the rear face of the mody member 15 and the center of the roller is less than the distance between the outer edge of the tube member 23 and the center of the V-shaped groove 33 to enable the rollers to engage the outer slanting face of the V-shaped groove when the cap is positioned.

In use, the lens cap is placed on the end of the tube member 23 by inserting the flange 21 within the tube member. As the lens cap is moved toward the tube member, the rollers 31 contact the internal surface of the tube member and are rotated and depressed until, upon further movement of the cap toward the tube member, they reach the V-shaped groove 33. At this point the flat marginal portion 16 of the rear face of the body member 15 is in sealing engagement with the outer edge of the tube 23 and the rollers are urged radially outward by the tension of the axle 29 and engage the slanting face of the V-shaped groove nearest the outer end of the tube member 23. Thus the expansive resilient force of the axle 29, transmitted to the rollers 31, reacts against the inclined face of the groove 33 to tend to pull the lens cap constantly inwardly and thus to keep the face 16 thereof tightly sealed against the forward end of the lens tube, until it is purposely removed. Removal of the lens cap from the tube member is accomplished by pulling the cap in a direction away from said tube member. The pulling force will cause the rollers 31 to be depressed radially inwardly until their surfaces are approximately even with the outside periphery of the flange 21 and thereby permit the cap to be pulled free of the tube member.

The optical tube member 23 may be, for example, a separate sun shade detachably mounted on a lens tube, or may be the lens tube itself, containing the lens 35 placed at a safe distance inwardly from the radial variation constituted by the groove 33.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A lens cap for use on the end of an optical tube member having a circumferential V-shaped groove along its internal surface and adjacent its outer end, said lens cap comprising an approximately circular body member having an approximately frusto-conical front face and flat marginal portion on its rear face and a central opening extending therethrough, a disk disposed within said central opening and secured to said body member, a cylindrical flange having one edge secured to said body member in coaxial relationship therewith and a free edge extending rearwardly from said body member, said flange having a diameter less than that of the body member and slightly less than the optical tube member opening, a circumferential groove along the inner periphery of said flange located in a plane spaced from and parallel to said flange free edge, a pair of diametrically opposed radial slots disposed through said flange and extending from said free edge to said body member, and a resilient axle located within said groove and having a rotatable roller adjacent each of its ends, said rollers extending through said slots, said rollers being spaced from said body member marginal portions so as to enable said rollers to engage an outermost portion of a tube member V-shaped groove while the marginal portion is engaged by the outer end of said tube member when said lens cap is positioned.

2. A lens cap for use on the end of an optical tube member having a circumferential V-shaped groove along its internal surface and adjacent its outer end, said lens cap comprising an approximately circular body member having a flat marginal portion on its rear face, a cylindrical flange having one edge secured to said body member in coaxial relationship therewith and a free edge extending rearwardly from said body member, said flange having a diameter less than that of the body member and slightly less than the optical tube member opening, a circumferential groove along the inner periphery of said flange located in a plane spaced from and parallel to said flange free edge, radial slots disposed through said flange and extending from said free edge to said body member and having rotatable rollers, said rollers extending member, and a resilient axle located within said groove through said slots, said rollers being spaced from said body member marginal portion so as to enable said rollers to engage an outermost portion of a tube member V-shaped groove while the marginal portion is engaged by the outer end of said tube member when said lens cap is positioned.

References Cited in the file of this patent

UNITED STATES PATENTS

| 2,304,364 | Marshall | Dec. 8, 1942 |
| 2,465,083 | Gradisar | Mar. 22, 1949 |

FOREIGN PATENTS

| 332,790 | Great Britain | July 31, 1930 |
| 533,653 | Germany | Sept. 17, 1931 |